US005429945A

United States Patent [19]

Shain

[11] Patent Number: 5,429,945
[45] Date of Patent: Jul. 4, 1995

[54] COMPOSTER

[75] Inventor: Stanley M. Shain, Cambridge, Mass.

[73] Assignee: Nature's Backyard, Inc., New Bedford, Mass.

[21] Appl. No.: 174,889

[22] Filed: Dec. 27, 1993

[51] Int. Cl.⁶ .............................................. C12M 1/04
[52] U.S. Cl. .................................... 435/313; 435/287; 422/184; 220/4.09; 220/908
[58] Field of Search .................... 435/287, 313, 299; 422/184; 71/8–10; 220/4.04–4.11, 4.28, 4.33, 484, 908

[56] References Cited

U.S. PATENT DOCUMENTS

| 4,060,945 | 12/1977 | Wilson | 52/169.5 |
| 4,984,561 | 1/1991 | Warrington | 422/184 |
| 5,052,570 | 10/1991 | Johansen | 220/4.33 |
| 5,096,080 | 3/1992 | Penny | 220/4.34 |

FOREIGN PATENT DOCUMENTS

2038304  7/1980  United Kingdom ................ 422/184

*Primary Examiner*—William H. Beisner
*Attorney, Agent, or Firm*—Cesari and McKenna

[57] ABSTRACT

An improved composter has a unique architecture that adaptively regulates the air and moisture content of an interior chamber to facilitate efficient decaying of organic matter contained therein. In an illustrative embodiment, the improved composter comprises spaced upper and lower cones disposed within a cylindrical barrel to form the chamber. A plurality of apertures are disposed along the surfaces of the barrel and cones, and are arranged such that a plurality of the apertures of the cones are in registration with the apertures of the barrel. The upper cone descends upon the organic matter as its volume decreases during its decomposition, while the apertures control the amounts of air and moisture penetrating the chamber to maintain a state of equilibrium that is conducive to rapid and efficient composting.

10 Claims, 4 Drawing Sheets

COMPOSTER

FIELD OF THE INVENTION

This invention relates generally to composting and, more specifically, to an improved composter for quickly and efficiently composting material.

BACKGROUND OF THE INVENTION

Composting is a natural decaying process in which organic matter (such as leaves, grass and animal products) are converted by naturally-occurring microorganisms to humus. Leaves are suitable for composting because they contain large amounts of carbon, and grass because it has a high content of nitrogen. Together, these materials provide a balance of nutrients in the resulting fertilizer that is crucial to the growth of plant life.

Composting simply involves gathering organic matter and soil, which contains the micro-organisms, into a pile. The micro-organisms, i.e., microbes, consume the organic matter and produce heat energy. The resulting warm, seething environment stimulates reproduction of additional microbes until, ultimately, the organic matter/soil pile decays to humus. However, composting in an open atmosphere is time-consuming and inefficient because the microbes perish in inclement weather.

Specifically, the type of microbes involved in composting requires oxygen to live, that is, the microbes are aerobic. When the organic matter becomes sopping wet (e.g., from rain), oxygen cannot penetrate the material. With reduced levels of oxygen, these aerobic organisms suffocate, thus inhibiting decomposition. Accordingly, composting is most efficient when the moisture and air content of the organic matter is controlled to allow the aerobic microbes to flourish.

A conventional composter facilitates decomposition by engulfing the organic matter to contain the energies, i.e., heat, radiated by the microbial families "working" the pile of organic matter. Because these families flourish at high temperatures, the habitats provided by these composters accelerate the natural decaying process.

A conventional composter typically comprises a wire cage or plastic/wooden container, the latter having holes scattered throughout its body. The composter is generally small, e.g., only 25–30 inches in diameter, and can accommodate only small quantities of material, e.g., 12 cubic feet. The organic matter is typically shoveled into a domed pile in the container and left to decay, which may take years despite the specially fabricated habitat.

When a cover is affixed to the container to prevent rodents from accessing the organic matter, a large air space prevails typically above the material as it decomposes, thereby creating an imbalance of air and moisture content in the container. This leads to inefficient composting.

The present invention is directed to increasing the efficiency of composting, and overcoming a number of the drawbacks of the conventional composter.

SUMMARY OF THE INVENTION

Briefly, the invention resides in an improved composter having a unique architecture that adaptively regulates the air and moisture content of organic matter material in the composter to facilitate efficient decaying of that material. Broadly stated, the composter comprises a hollow container that is terminated at its ends by similarly-oriented upper and lower elements to define a chamber therebetween for housing the organic matter during decomposition. In accordance with the invention, the perimeters of the bases of the upper and lower elements correspond to the inner surface of the container to allow frictional engagement between the elements and container.

In an illustrative embodiment, the improved composter comprises similarly-oriented upper and lower cones spaced vertically within a cylindrical barrel to form a chamber therebetween within the barrel. The barrel has an open top, open bottom, and a cylindrical surface with parallel rows of apertures disposed therein, which rows extend in a direction parallel to the barrel's central axis. Each cone consists of a conical surface defined by an apex and a lower circular edge, which is called a "base". The conical surface also has a plurality of rows of apertures; the rows in the cone extend from the apex to the base.

The barrel is formed by rolling a rectangular sheet of material, e.g., plastic material, into a cylindrical shape. The rectangular sheet contains the rows of apertures at regular intervals, i.e., with approximately equal inter-row spacings. The radius of the barrel can be selected upon assembly of the composter by overlapping the edges of the rectangular sheet to a selected extent during forming of the cylindrical shape. In doing so, after formation, selected ones of the rows of apertures, i.e., those in the overlapped portions of the sheet, are disposed in registration. Fastening systems can be employed in connection with these aligned holes to, inter alia, maintain the sheet in the barrel configuration.

Each cone is formed from a sheet of material, e.g., plastic material, in the shape of a circular disc section. The sheet contains the rows of apertures, again, at regular intervals, extending radially from the center of the disc. The cone is formed by rolling of the disc section so that the center of the disc section becomes the apex of the cone, and portions of the disc section overlap one-another. The radii of the bases of the cones are selected to be just slightly smaller than that of the barrel. Again, as with the barrel, after formation of the cones, selected ones of the rows of apertures therein are disposed in registration so as to provide through-holes for receiving fasteners of a fastening system.

When assembled for use, the apex of the lower cone projects into the chamber of the barrel at one end such that the apertures disposed around the perimeter of its base are aligned with the apertures disposed along a lower edge of the barrel. Anchor pins are inserted through these apertures and into the ground to secure the lower cone and barrel. The upper cone is then inserted into the other end such that the base of the upper cone projects into the barrel chamber.

As should be apparent from the description given above, a feature of the invention is that the cones and barrel are adjustable to accommodate different quantities of organic matter. The barrel diameter is adjusted by suitably selecting the extent of overlap of the rectangular section. Then, the cones are formed such that the cones fit snugly within the inner surface of the barrel.

Another feature of the invention is the adaptive regulation of the air and moisture content within the chamber. Once the organic matter material is loaded into the barrel, the upper cone is inserted into the barrel and descends to rest upon the material with a significant portion of the inner cone surface defining a space occupied by the organic matter. This eliminates large air spaces present in previous composters that disrupted the air/moisture content of the chamber. As the volume of organic matter is reduced through decomposition, the upper cone descends, under its own weight, in tandem with the material so as to maintain the defined space occupied by the cone surface.

In accordance with an aspect of the invention, an unoccupied volume under the apex of the upper cone contributes to the adaptive regulation of the chamber environment. The unoccupied volume is small and regulated to remain small, despite decomposition of the organic matter. Similarly, the barrel and cone apertures control the amounts of air and moisture penetrating the chamber to maintain a state of equilibrium that is conducive to rapid and efficient decomposition.

In another aspect of the invention, the cones have identical shapes that facilitate composting. That is, the conical shape of the lower cone allows smaller, churned particles of organic matter to naturally tumble to the base of the cone while the larger, "undigested" particles remain at its apex.

The composter provided by the invention avoids the adverse affects of rainfall on microbe activity. The upper cone acts as an umbrella to divert most of the precipitation away from the material in the barrel. Specifically, a portion of the rain falls through the apertures of the composter and onto the organic matter; however, most of the rain runs down the conical surface of the upper cone, then between the cone base and the barrel, and along the inner cylindrical surface of the barrel to the ground. Natural capillary actions of the organic matter causes the moisture entering the chamber at the outer layers of the organic matter, resting against the inner surface of the barrel, to be dispersed through out the organic matter for use by the microbial families. Any excess amounts of water are drained from the organic matter along the conical surface of the lower cone or through the lower cone's apertures.

Moreover, the upper and lower cones may be interchanged for ease of use. After composting is completed, the upper cone may be removed from the composter, placed on the ground and the barrel placed over it. The upper cone then becomes the lower cone for subsequent composting.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
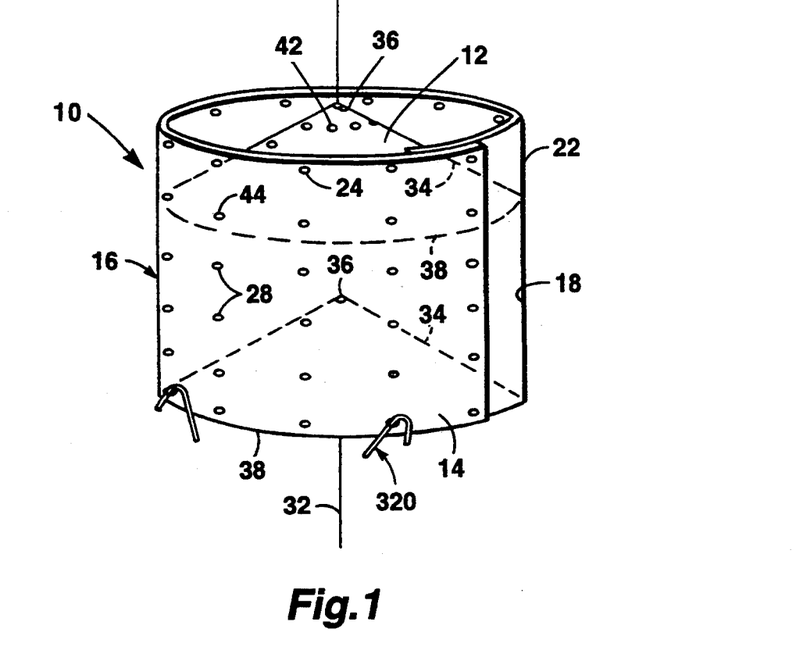
FIG. 1 is a perspective view of an illustrative embodiment of an improved composter in accordance with the invention.

FIG. 1 depicts an illustrative embodiment of the improved composter 10 comprising a hollow upper cone 12 and a hollow lower cone 14, each of which may be frictionally coupled to a cylindrical barrel 16 to form a chamber 18 therebetween within the barrel 16. However, it should be noted that other embodiments of composters may be utilized in accordance with the teachings of the invention. For example, the improved composter may comprise identical upper and lower frustum elements, together with a hollow container, each having polygonal structures, as described below. Despite its specific shape, the novel composter adaptively regulates air and moisture contents of the chamber 18 to facilitate efficient decaying of organic matter (not shown) contained within the composter 10.

The barrel 16 has a cylindrical surface 22 with rows 24 of apertures 28 disposed therein in a direction parallel to the center axis 32 of the chamber 18. Each cone 12, 14 has a conical surface 34 defined by an apex 36 and a base 38, with a plurality of rows 42 of apertures 44 disposed in the conical surface 34 and extending from the apex 36 to the base 38. These apertures 44 are arranged such that, when the cones 12, 14 are inserted into the barrel 16, they are in registration with corresponding apertures 28 of the barrel 16.

The cones and barrel apertures 28, 44 are preferably circular holes, each having a diameter of about 3/8 inch (0.94 cm); however, it will be apparent to those skilled in the art that other apertures, such as elongate slits, may be utilized. Nevertheless, the sizes of these apertures are small enough to prevent rodents from entering the chamber 18 and accessing the organic matter material, while being large enough to facilitate the flow of air and moisture into the chamber 18.

To facilitate decomposition of the organic matter, streams of air flow into the chamber 18 through the network of apertures 28, 44 disposed throughout the composter 10. Specifically, the apertures 28, 44 in the barrel 16 and upper cone 12 allow air to infiltrate the organic matter material from the sides and top, while the holes in the lower cone 14 facilitate the flow of air underneath the material. In addition, a small volume underneath the apex 36 of the upper cone 12, unoccupied by the material, provides a compartment of air for the chamber 18. These air sources assure that aerobic microbes in the organic matter thrive, thereby promoting decomposition.

In accordance with the invention, the selected disposition of apertures 28, 44 throughout the composter 10 not only regulates the air content of the chamber 18, but also regulates its moisture content to facilitate decaying of the organic matter material. For example, during a torrential downpour of rain, only a portion of this precipitation enters the chamber 18 through the apertures 28, 44. Most of the moisture is diverted from the edges of the upper cone 12, onto the surfaces of the barrel 16 and to the ground. The natural capillary action of the organic matter causes the moisture entering the chamber 18 at the outer layers of the organic matter in the chamber 18 to be dispersed through out the organic matter for use by the microbial families. This arrangement maintains a proper balance of moisture and air within the chamber 18 to optimize the composting process.

As the organic matter material is consumed and converted to humus, the volume of organic matter decreases and the shape of the lower cone 14 facilitates natural "turning" of the organic matter. That is, the conical shape of the lower cone 14 forces smaller, churned particles of the organic matter material to naturally tumble to the base 38 of the cone while the larger, undigested particles remain at the apex 36, thus obviating manual labor needed to turn the pile. In addition, the moisture penetrating the chamber of the barrel assists in shifting the decayed material from the apex 36 to the base 38.

Figure 2:
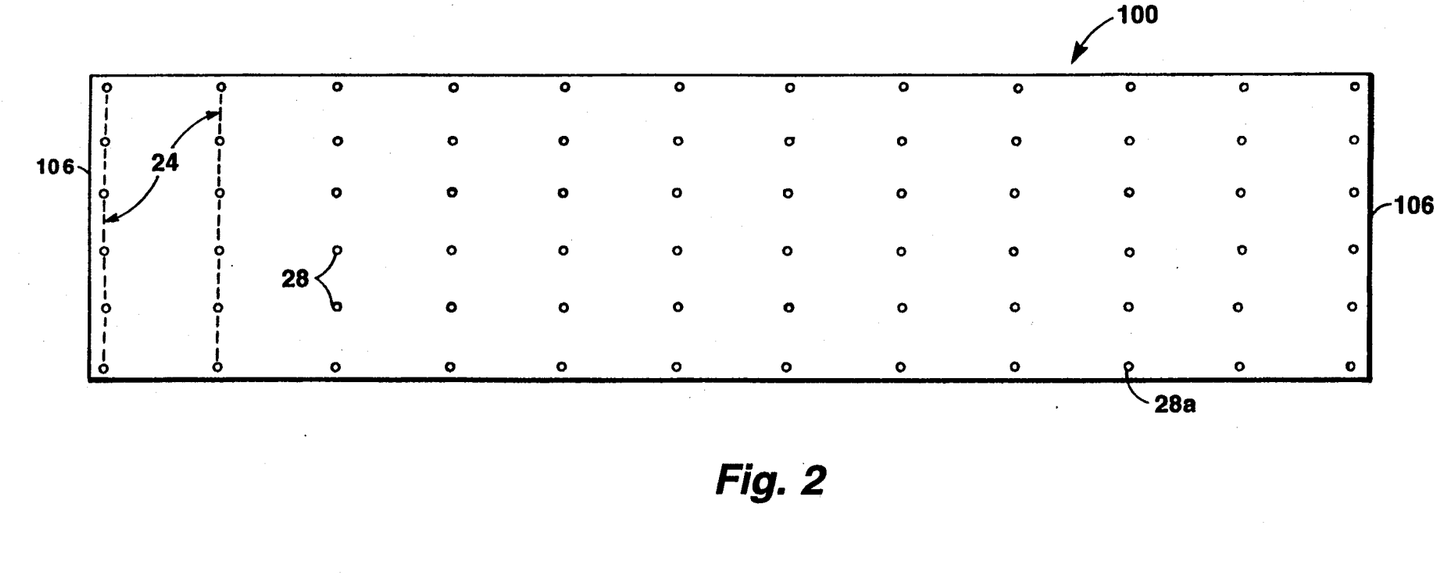
FIG. 2 is a plan view of a rectangular section that forms a barrel of the improved composter of FIG. 1.
Figure 3:
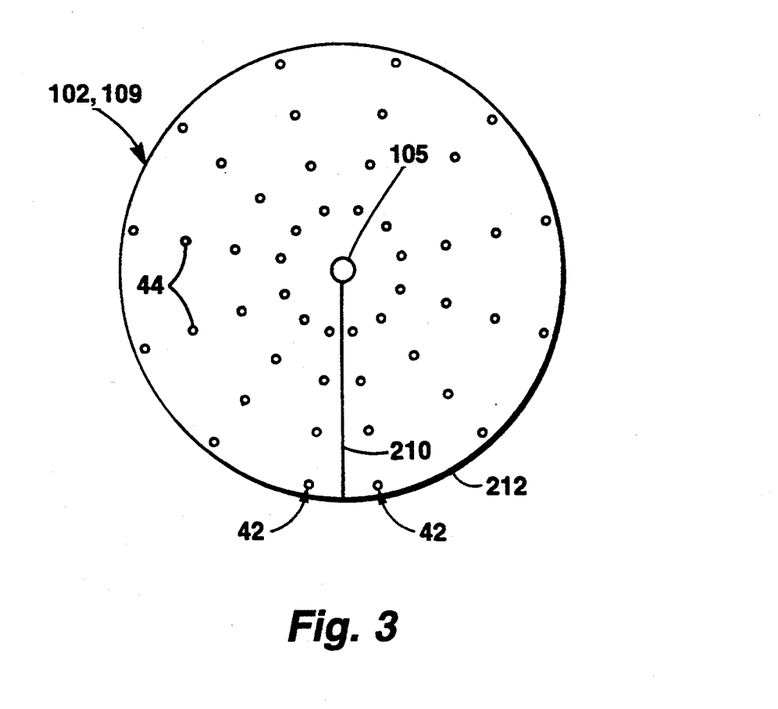
FIG. 3 is a plan view of a circular disc section that form either the upper or lower cone of the improved composter of FIG. 1.

Referring additionally to FIGS. 2 and 3, the composter 10 is formed from three discrete sheets of material, namely, a rectangular section 100 (FIG. 2) and two, preferably identical, circular disc sections 102, 104, one for each cone 12, 14 (FIG. 3). These sections 100-104 are preferably made entirely from post-consumer plastic material, i.e., "curb-side" plastic material, although other types of plastics or materials may be used. The plastic is preferably high-density polyethylene (HDPE), i.e., code #2 plastic, which is blow-molded plastic generated from, e.g., recycled detergent bottles. The bottles are typically washed and extruded to form pellets to which colorant, such as black or green, may be added to produce a constant color.

In the illustrative embodiment of the invention, the rectangular section 100 is preferably about 32 inches (81 cm) wide by about 11.5 feet (3.5 meters) long, while each disc section 102, 104 has a diameter of 44 inches (112 cm). The sheet thicknesses of these sections are between 60 and 120 mils (1.5 and 3 mm), although the disc sections 102, 104 may be thicker because, when functioning as lower cones 14, they may bear as much as 1,000 lbs. The apertures 28 are arranged in the rectangular section 100 in rows 24, forming a rectilinear array across the length and width of the section. Each disc section 102, 104 has a center aperture 105 with a diameter of ¾ inch. The rows 42 of apertures 44 extend radially from the center aperture 105. In the illustrative embodiment, there are preferably four apertures 44 in each radial row 42.

The disc section 102, 104 also has a radially directed slit 210 extending from the center aperture 105 to a circumferential edge 212 of the disc section 102, 104 and, e.g., disposed between two selected radial rows 42. The slit 210 preferably is made about 1.5 inches from a selected radial row 42, and the "edge" of the slit with the selected row becomes the overlapping edge when forming the cone 12, 14. Alternately, the slit 210 can bisect a selected pair of the rows 42 so that the slit 210 is disposed equidistant between the selected rows 42.

In accordance with the invention, a predetermined relationship exists between the apertures 28 in the rectangular section 100 and the apertures 44 of the disc sections 102-104. Specifically, the number of radial rows 42 in the disc section 102-104 preferably equals the number of rows 24 of apertures 28 in the rectangular section 100. The "last" apertures 44 in each row 42 (i.e., the apertures 44 farthest from the center aperture 105) of the disc sections 102-104 are spaced at a distance approximately equal to the inter-row distance in the rectangular section 100. Consequently, those "last" apertures 44 in the disc section 104 forming the lower cone 14 can align, after assembly, with the lowest apertures 28 in the barrel 16 (i.e., the apertures 28a nearest the bottom of the barrel 16).

For example, and as shown, the rectangular section 100 has six apertures 28 per row 24, and the apertures 28 are spaced equidistant from each other, e.g., 1-foot apart. The rows 24 are set-off, e.g., about one inch from the short edges 106 (i.e., the 32 inch edges), so there are preferably twelve rows 24 for this embodiment. The first and last aperture 28 of each row 24 are set-off, e.g., one inch from the long edges 108 of the rectangular section 100. To ensure that the rows 24 of apertures 28 in the barrel 16 correspond with the radial rows 42 of the cones 12, 14, there are twelve radial rows 42 with each row being separated from adjacent ones by an arc angle of 30°.

ASSEMBLY AND OPERATION

The composter 10 as an item of commerce is preferably shipped disassembled, with the rectangular and disc sections 100-104 suitably packaged but not forming the barrel 16 and cones 12, 14. An end user can then assemble the composter 10 using the following simple steps.

To form the barrel 16, the rectangular section 100 is rolled to form a cylindrical or barrel shape, such that the two short end portions (adjacent the short edges 106) of the rectangular section 100 are overlapped, so that the apertures 28 of at least two rows 24 (i.e., at least one row in each end portion) are in alignment. Then, fasteners 200, e.g., pins (FIG. 4), are pushed through the aligned apertures 28 so as to interconnect the overlapped portions 203, 205 (see FIG. 4) of the rectangular section 100, thereby maintaining the rectangular section 100 in that barrel configuration. It will be apparent to those skilled in the art that variations in the diameter of the barrel can be made by overlapping an additional number of rows 24. Once assembled, the barrel 16 resembles an upright trash can sitting on the ground.

Figure 4:
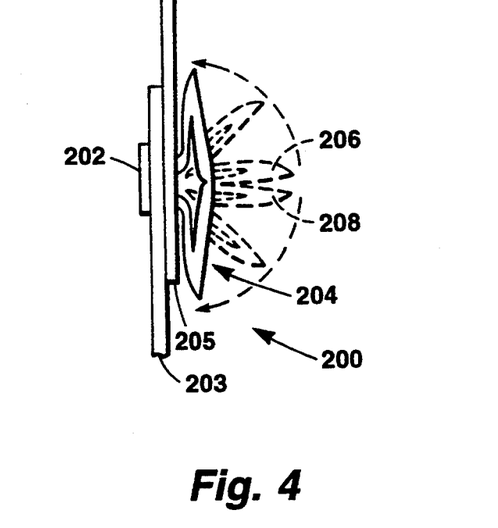
FIG. 4 depicts a fastener for locking the rectangular and circular disc sections to form the barrel and cones of FIG. 1.

As shown in FIG. 4, each pin 200 is preferably configured to slip into the overlapped apertures 28 and secure the overlapped portions 203, 205 of the disc section 100 together. At least one pin is needed to lock the rectangular section 100 into a barrel configuration. The pin 200 is preferably a small, plastic piece with a flat, circular head 202 and a shaft 204 that is split into two collapsible wings 206, 208, each having a diameter of approximately ¼". The wings 206, 208 are inserted through the overlapped apertures 28, and bent in opposite directions (as shown in phantom) to clasp the overlapped portions 203, 205 of the disc section 100 between the head 202 and the bent wings 206, 208. Of course, it will be apparent to those skilled in the art that other types of fasteners, such as nuts and bolts or wire, could be used within the teachings of the invention.

With reference again to FIG. 1, to form the cone 12, 14, a lifting handle, e.g., a rope (not shown), is initially formed into a pull handle by creating a knot with a large loop. The rope is preferably ¼ inch in diameter and eighteen inches in length, and made of polypropylene or polyester because that material does not disintegrate in the organic matter and is not affected by the microbes. The rope is inserted into the center hole through the slit with the knot underneath the apex 36 and the large loop projects from atop the apex 36. This forms a handle for pulling the upper cone 12 out from the barrel 16 or for pulling the lower cone 14 off the ground. The overlapping edge of the cone 12, 14 is then folded-over the adjacent edge so that, e.g., two of the radial rows 42 are in alignment. Then, fasteners, such as pins 200, may be pushed through the overlapping apertures 44, as described above.

When assembled, the apex 36 of the lower cone 14 projects into the chamber 18 of the barrel 16 such that the apertures 44 disposed nearest the cone base 38 are aligned with the apertures 28 disposed along a lower edge of the barrel. Anchor pins 320 are inserted through these apertures 28, 44 and into the ground to secure the lower cone 14 and barrel 16. Although pins 320 are shown as having a solid cross-section, they could also have a hollow core or an open cross-section. Alternatively, the pins could be composed of a folded plate. Advantageously, these latter two designs would allow air to enter the barrel and lower cone.

The improved composter 10 may be configured to a variety of sizes while controlling the mixture of moisture and air in the organic matter material. Specifically, the composter 10 may be configured to a size that accommodates large masses of organic matter, e.g., 30 cubic feet, representing approximately three times the capacity of previous composters. This is significant because large masses of decomposing material generate large amounts of heat energy radiated from the microbial families, which increases reproduction of these families and facilitates fast and efficient consumption of the organic matter.

In order to change the capacity of the composter, the cones 12, 14 and barrel 16 are adjustable. That is, to form composters 10 of various sizes, the number of overlapped rows 24 on the barrel 16 varies in relation with a corresponding number of overlapped radial rows 42 used in forming the cones 12, 14. For example, if one row 24 of barrel apertures 28 overlap, one radial row 42 of cone apertures 44 are overlapped, leaving eleven rows in the barrel 16 aligned with apertures 44 in eleven rows in the cone 14. Significantly, the composter 10 should be adjusted to the minimum size required to accommodate the available volume of organic matter material so as to obtain the benefits of the invention with respect to air and moisture regulation.

Figure 5:
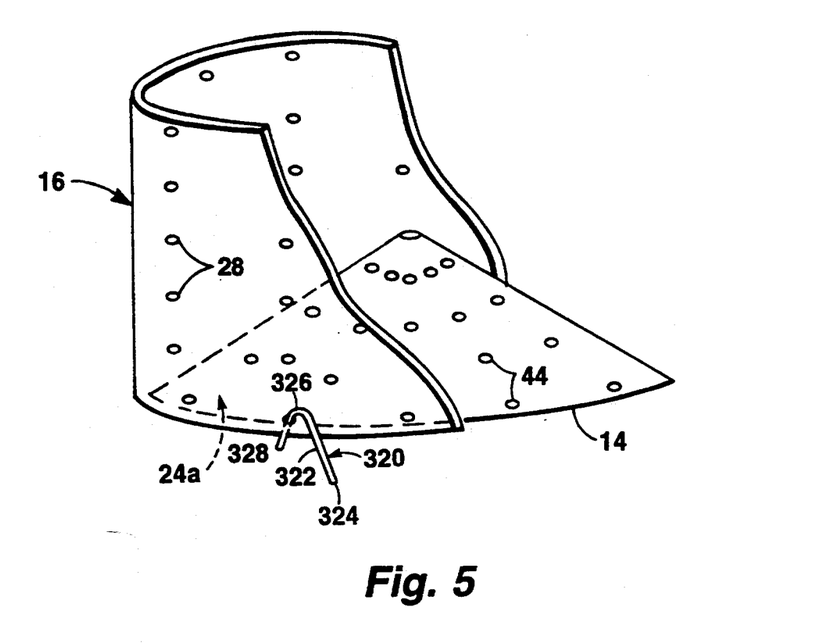
FIG. 5 depicts an anchor pin used to secure the lower cone and barrel in FIG. 1.

To assemble the composter 10, one cone 12, 14 is laid on the ground, i.e., the lower cone 14, and the barrel 16 is slipped over it and adjusted until the apertures 28, 44 are in alignment, as shown in FIG. 5. Specifically, the apertures 44 along the base 38 of the cone 14 are aligned with the bottom row 24a of the barrel 16 so that an anchor pin 320 can be inserted through both of them and into the ground. The lower cone 14 and barrel 16 are then secured to the ground with additional anchor pins 320.

The anchor pin 320 preferably comprises a 9-inch elongate shank 322 with a sharp point 324 at one end and an arcuate head 326 configured as a hook at the other end. The hook 326 has a 1.5 inch diameter. The long end of the shank 322 is inserted through the bottom row 24, 42 of the barrel 16 and the lower cone 14, and then into the ground. The short end 328 of the hook 326 does not pass through the apertures 28, 44, but rather is inserted into the ground, outside of the barrel 16, to secure the structure to the ground.

With reference again to FIG. 1, during use of the composter 10, the organic matter material is loaded into the barrel 16 on top of the lower cone 14. Then, the upper cone 12 is inserted into the barrel 16, such that the base 38 of the upper cone 12 projects into the chamber 18 and frictionally engages the inner wall of the barrel 16. In accordance with the invention, the upper cone 12 rests on top of the organic matter and applies a downward force onto the upper surface of the material. An air cushion between the organic matter material and the upper cone 12 allows the cone 12, 14 to naturally settle over the material, such that the material eventually supports the weight of the upper cone 14.

As the organic matter material decomposes, and therefore reduces in volume, the upper cone 12 automatically descends within the barrel 16 as its weight overcomes the frictional forces between it and the barrel. Consequently, the composter 10 self-regulates the volume of air above the organic matter and beneath the upper cone 12. By so doing the upper cone's height above the organic matter remains approximately constant, as does the volume of air therebetween as the organic matter decomposes. This promotes decomposition by maintaining proper moisture levels so that the material does not completely dry out.

Figure 6:
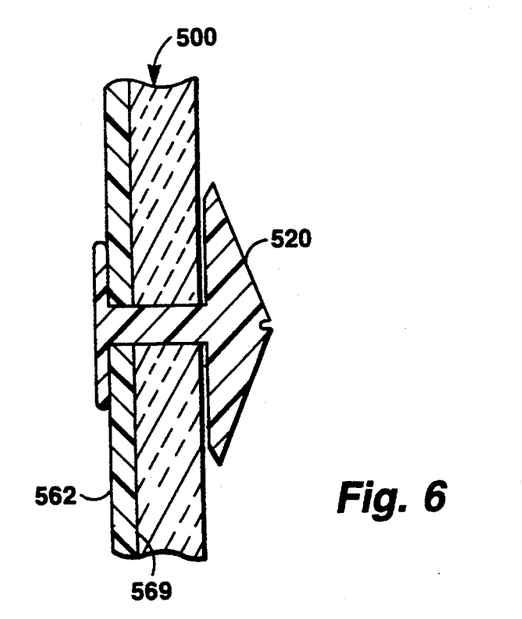
FIG. 6 depicts a thermal blanket for use with the improved composter of FIG. 1.

In another aspect of the invention, a thermal blanket, depicted in FIG. 6 at 500, may be utilized to insulate the organic matter and retain heat that is generated during its decomposition. The blanket 500 is preferably constructed of foam plastic and affixed to either the inner surface 562 or outer surface 564 of the barrel by another type of fastener 520. The blanket has a plurality of apertures disposed therein which correspond in size and location with the apertures of the barrel. However, it should be noted that the upper cone 12 also thermally insulates the organic matter, i.e., maintains the heat generated by the microbial families in the composter 10, to further accelerate decomposition and conversion of the organic matter into humus.

The composter 10 may be left outside in an open area so that its dark colors may transfer solar energy from the sun to the chamber 18. Nevertheless, the composter 10 is effective in shaded areas not exposed to sunlight.

While there has been shown and described an illustrative embodiment for adaptively regulating the air and moisture content of organic matter material in a composter to facilitate efficient decaying of that material, it is to be understood that various other adaptations and modifications may be made within the spirit and scope of the invention. For example, the invention is applicable to an improved composter comprising a hollow container terminated at its ends by identical upper and lower frustum elements with frusto-surfaces. For this embodiment of the invention, shown in FIG. 7, the container 700 and frustum elements 710, 720 each have polygonal structures arranged such that the perimeters of the bases 712, 714 of the elements correspond to the inner surface 702 of the container to enable frictional engagement between the elements and container.

Figure 7:
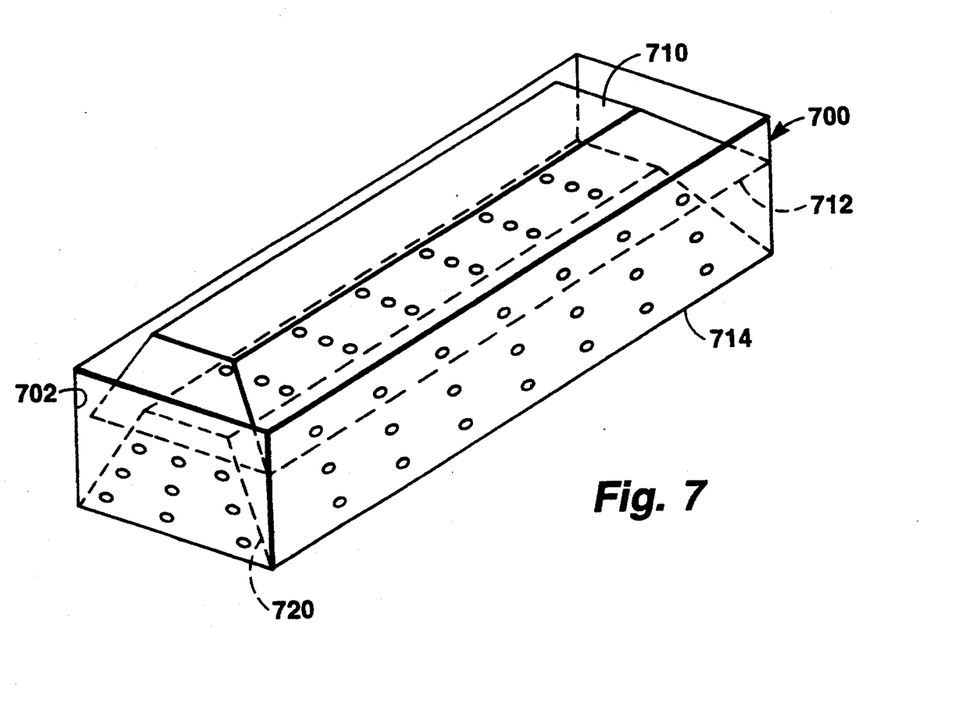
FIG. 7 is a perspective view of an alternate embodiment of the improved composter in accordance with the invention.

The container and frustum elements are configured in a manner similar to the illustrative embodiment set forth herein. For example, the apertures of the container and elements are configured and arranged according to the predetermined relationship described above. In addition, adaptive regulation of the air and moisture content within the chamber is achieved as the upper element descends upon the material with a significant portion of its inner frusto-surface defining a space occupied by the organic matter. An unoccupied volume under the apex of the upper element, along with the container and element apertures, control the amounts of air and moisture penetrating the chamber, thereby maintaining a state of equilibrium that is conducive to rapid and efficient decomposition.

The foregoing description has been limited to a specific embodiments of this invention. It will be apparent, however, that variations and modifications may be made to the disclosed embodiments, with the attainment of some or all of the invention's advantages. Therefore, it is the object of the appended claims to cover all such variations and modifications as come within the true spirit and scope of the invention.

What is claimed is:

1. A composter for efficiently decomposing organic matter contained in a chamber thereof, said composter comprising:

a hollow container having inner and outer surfaces with a plurality of rows of container apertures disposed therein;

a lower frustum element frictionally affixed to a lower portion of said inner surface of said container, said lower frustum element terminating said container and having a frusto-surface with an apex and a base, said frusto-surface having a plurality of lower frustum apertures disposed therein extending from said apex to said base; and an upper frustum element frictionally coupled to an upper portion of said inner surface of said container so as to define said chamber between said upper and lower frustum elements within said container, said upper frustum element having a frusto-surface with an apex and a base, said frusto-surface having a plurality of upper frustum apertures disposed therein extending from said apex to said base, wherein gravitational forces cause said upper frustum element to descend upon said organic matter as air and moisture penetrate said apertures and as decomposition reduces the volume of organic matter in said chamber to maintain a state of equilibrium within said chamber that is conducive to efficient decomposition of said organic matter.

2. The composter of claim 1 further comprising a thermal blanket affixed to one of said inner and outer surfaces of said hollow container.

3. A composter for efficiently decomposing organic matter contained in a chamber thereof, said composter comprising:

a barrel having a cylindrical surface with a plurality of rows of barrel apertures disposed therein;

a lower cone affixed to a lower portion of said barrel, said lower cone having a conical surface with an apex and a base, said conical surface having a plurality of lower cone apertures disposed therein extending from said apex to said base; and an upper cone frictionally coupled to an upper portion of said barrel so as to define said chamber between said upper and lower cones within said barrel, said upper cone having a conical surface with an apex and a base, said conical surface having a plurality of upper cone apertures disposed therein extending from said apex to said base, wherein gravitational forces cause said upper cone to descend upon said organic matter as air and moisture penetrate said apertures and as decomposition reduces the volume of organic matter in said chamber to maintain a state of equilibrium within said chamber that is conducive to efficient decomposition of said organic matter.

4. The composter of claim 3 wherein said barrel apertures include lower barrel apertures disposed along a lower portion of said cylindrical surface and upper barrel apertures disposed along an upper portion of said cylindrical surface.

5. The composter of claim 4 wherein at least a plurality of said lower cone apertures are in registration with said lower barrel apertures.

6. The composter of claim 5 further comprising means for securing said lower cone to said barrel.

7. The composter of claim 6 wherein said securing means comprises an anchor pin.

8. The composter of claim 7 further comprising a thermal blanket affixed to one of an outer surface and inner surface of said barrel.

9. A composter for rapidly and efficiently decomposing organic matter contained in a chamber thereof, said composter comprising:

a container having an inner polygonal surface with a plurality of rows of apertures disposed therein, a lower element affixed to a lower portion of said container, said lower element having a frusto-surface with an apex and a polygonal base, said frusto-surface having a plurality of apertures disposed therein extending from said apex to said base, a perimeter of said polygonal base corresponding to said inner polygonal surface of said container; and an upper element frictionally coupled to an upper portion of said container so as to define said chamber between said upper and lower elements within said container, said upper element having a frusto-surface with an apex and a polygonal base, said frusto-surface having a plurality of apertures disposed therein extending from said apex to said base, a perimeter of said polygonal base corresponding to said inner polygonal surface of said container, wherein gravitational forces cause said upper element to descend upon said organic matter while occupying a significant portion of an inner surface of said upper element surface such that an unoccupied area under said apex of said upper element controls, together with said apertures, air and moisture penetrating said chamber, thereby maintaining a state of equilibrium that is conducive to rapid and efficient decomposition.

10. A method for assembling components of a composter configured to efficiently decompose organic matter, said components including a rectangular section and first and second disc sections, said method comprising the steps of:

rolling the rectangular section, the rectangular section having a plurality of apertures disposed along a length thereof extending from a first end to a second end;

adjusting said ends of the rectangular section such that said first end overlaps said second end and such that said apertures disposed along said first end are in alignment with said apertures disposed along said second end;

interconnecting said overlapped ends to form a barrel with a chamber having an inner surface with a predetermined diameter;

forming a radially directed-slit from a center aperture to a circumferential edge in each of the disc sections, said slit creating first and second slit edges, each disc section having a plurality of radial rows of apertures disposed therein, said radial rows extending from an apex to a base thereof;

adjusting said slit edges of said disc sections such that said first edges overlap said second edges and such that said radial rows of apertures disposed along said first edge are in alignment with said radial rows of apertures disposed along said second edge;

interconnecting said overlapped edges to form first and second cones, the bases of said cones having diameters substantially equivalent to the predetermined diameter of said inner surface of said chamber;

inserting said first cone into said barrel such that said apex of said first cone projects into said chamber of said barrel;

adjusting said first cone such that said apertures disposed along a lower side of said barrel are in alignment with apertures disposed along said base of said first cone;

securing said first cone to said barrel with anchor pins; and inserting said second cone into said barrel such that said base of said second cone projects into said chamber and frictionally engages said inner surface.

* * * * *